US011615620B2

(12) United States Patent
Adam (10) Patent No.: US 11,615,620 B2
(45) Date of Patent: Mar. 28, 2023

(54) SYSTEMS AND METHODS OF ENFORCING DISTANCING RULES

(71) Applicant: Johnson Controls Tyco IP Holdings LLP, Milwaukee, WI (US)

(72) Inventor: Lipphei Adam, Nolensville, TN (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/196,717

(22) Filed: Mar. 9, 2021

(65) Prior Publication Data

US 2021/0357649 A1 Nov. 18, 2021

Related U.S. Application Data (60) Provisional application No. 63/025,806, filed on May 15, 2020.

(51) Int. Cl.
*G06V 20/40* (2022.01)
*G06T 7/593* (2017.01)
(Continued)

(52) U.S. Cl.
CPC .......... *G06V 20/41* (2022.01); *G06K 9/6215* (2013.01); *G06T 7/593* (2017.01); *G06V 20/53* (2022.01); *G06V 40/171* (2022.01); *G06T 2207/10016* (2013.01); *G06T 2207/30232* (2013.01); *G06V 2201/07* (2022.01)

(58) Field of Classification Search
None
See application file for complete search history.

(56) References Cited

U.S. PATENT DOCUMENTS

| 2005/0143096 A1* | 6/2005 | Boesch ................... G01S 19/14 |
| | | 455/456.3 |
| 2008/0106599 A1 | 5/2008 | Liu et al. |

(Continued)

FOREIGN PATENT DOCUMENTS

| CN | 110543867 A | 12/2019 |
| CN | 110598558 A | 12/2019 |

OTHER PUBLICATIONS

A People Counting System for Use in CCTV Cameras in Retail. Cruz et al (Year: 2020).*

(Continued)

*Primary Examiner* — Delomia L Gilliard
(74) *Attorney, Agent, or Firm* — ArentFox Schiff LLP (57) ABSTRACT

Disclosed herein are systems, methods, and non-transitory computer readable mediums directed to identifying persons monitored on video frames of a video feed, determining if the number of people on a monitored video frame is above a prescribed group threshold, and if so, calculating distances between each respective person in the monitored video frame. The calculated distances between each respective person are then compared to a prescribed distance threshold and alerts are generated in response to any calculated distance not satisfying the prescribed threshold. Identification of persons in a monitored video frame may be performed by, for example, facial recognition software. Calculation of distance between persons in a monitored video frame may be performed, for example, by using bounding boxes, machine learning, or other classification techniques.

20 Claims, 6 Drawing Sheets

(51) Int. Cl.
   *G06K 9/62*     (2022.01)
   *G06V 20/52*    (2022.01)
   *G06V 40/16*    (2022.01)

(56) References Cited

U.S. PATENT DOCUMENTS

2016/0110591 A1    4/2016   Smith et al.
2017/0169297 A1*   6/2017   Bernal .................. G06V 20/53
2018/0260615 A1    9/2018   Chauhan et al.
2020/0153648 A1    5/2020   Ihara
2021/0374430 A1*   12/2021  Siemer ................. G06K 9/6215

OTHER PUBLICATIONS

Using Computer Vision to enhance Safety of Workforce in Manufacturing in a Post COVID World. Khandelwal et al. (Year: 2020).*

Monitoring COVID-19 social distancing with person detection and tracking via fine-tuned YOLO v3 and Deepsort techniques. Punn et al. (Year: 2021).*

Punn et al., "Monitoring COVID-19 social distancing with person detection and tracking via fine-tuned YOLO v3 and Deepsort techniques", arxiv.org, Cornell University Library, 201 Olin Library Cornell University Ithaca, NY 14853, May 4, 2020.

Khandelwal et al., "Using Computer Vision to enhance Safety of Workforce in Manufacturing in a Post COVID World", arxiv.org, Cornell University Library, 201 Olin Library Cornell University Ithaca, NY 14853, May 11, 2020.

Extended European Search Report for European Patent Application No. 21 17 2890, dated Oct. 12, 2021 (11 pages).

\* cited by examiner

SYSTEMS AND METHODS OF ENFORCING DISTANCING RULES

CROSS-REFERENCE TO RELATED APPLICATIONS

This application claims priority to U.S. Provisional Application No. 63/025,806 titled "SYSTEMS AND METHODS OF ENFORCING SOCIAL DISTANCING RULES," filed May 15, 2020, which is assigned to the assignee hereof, and incorporated herein by reference in its entirety.

BACKGROUND

The present disclosure relates generally to video monitoring systems, and more particularly, to systems and methods for using video analytics to determine persons-of-interest that appear in a video feed and determining whether persons are obeying social distancing rules.

Video surveillance systems are commonly used to monitor desired environments. Often, it is desirable to review the video feeds to determine whether any particular person-of-interest (POI) were in the environment, and if so, when the persons were there and who they came into contact with. Currently there is no automatic and easy way to perform these reviews without spending hours or even days reviewing surveillance video recordings to identify POIs. Additionally, tracking each potential person a POI came into contact with must be done manually. These manual processes are time and labor intensive, hence limiting the efficacy to at most two degrees of separation.

Furthermore, entities that own or use space within a building may implement constraints on occupancy and social distancing in order to reduce the spread of a virus from a POI, such as but not limited to COVID19. Implementing such solutions requires a lot of manpower and can require monitoring large areas, which can be expensive and/or inefficient.

Thus, improved solutions for monitoring social interactions, occupancy and social distancing are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, methods, and non-transitory computer readable mediums for determining and alerting to social distancing violations.

In an aspect, a video analysis system for providing an alert for a social distancing violation is provided. The system includes at least one camera generating a video feed of an area, a memory, and a processor in communication with the memory to access computer-readable instructions that when executed configure the processor to: monitor video frames of the video feed, determine if a number of people in a monitored video frame is above a group threshold, calculate a distance between each respective person among the number of people in the monitored image to each of the other people in the monitored video frame in response to the number of people being above the group threshold, compare each calculated distance to a distance threshold, and generate an alert in response to any calculated distance not satisfying the distance threshold.

In one or more implementations, the memory and processor are coupled with a computing device. For example, the computing device can be a cloud-based structure, or can be integrated with the at least one camera. In one or more implementations, the system includes a communications component for facilitating communications between the computing device and external devices. In one or more implementations, the system includes a display having a user interface component. For example, the display can be configured to display the generated alert. In one or more implementations, the system includes a speaker configured to output the generated alert. In one or more implementations, each monitored video frame includes a timestamp for identifying a respective monitored video frame.

In one or more implementations, the system includes a distance determiner component for implementing a presentation layer to convey information regarding the calculated distances between each respective person among the number of people in the monitored image to each of the other people in the monitored video frame in response to the number of people being above the group threshold. In one or more implementations, the system includes an object determiner component for implementing a presentation layer to convey information regarding the number of people determined to be in the monitored video frame.

In an aspect, a method of providing an alert for a distance violation is provided. For example, the method may be carried out by a processor configured by executing software instructions accessible from a computer readable medium. The method includes monitoring video frames of a video feed captured by a camera. Further, the method includes determining if a number of people in a monitored video frame is above a group threshold. Thereafter, the method calculates a distance between each respective person among the number of people in the monitored video frame to each of the other people in the monitored image in response to the number of people being above the group threshold. Next, the method compares each calculated distance to a distance threshold. The method then generates an alert in response to any calculated distance not satisfying the distance threshold.

In one or more implementations, in the method the processor is further configured to identify the number of people in a monitored video frame by using facial recognition software.

In one or more implementations, when determining if a number of people in a monitored video frame is above a group threshold, in the method the processor is further configured to compare additional video frames having the number of people at a first time and at a second time to determine if the number of people in the monitored video frame are excluded from satisfying the distance threshold, and if the number of people are determined to be excluded from satisfying the distance threshold, exclude the number of people from the group threshold requirement. For example, the number of people excluded from satisfying the distance threshold can be classified as family members.

In one or more implementations, when calculating a distance between each respective person among the number of people in the monitored video frame to each of the other people in the monitored video frame in response to the number of people being above the group threshold, in the method the processor is further configured to calculate a first physical distance between a first person of the number of people and a second person of the number of people identified the monitored video frames using a distance determination model that uses a first size of a first bounding box around the first person to determine a first depth component of a first set of coordinates for the first person, and that uses a second size of a second bounding box around the second person to determine a second depth component of a second set of coordinates for the second person.

In one or more implementations, when generating an alert in response to any calculated distance not satisfying the distance threshold, in the method the processor is further configured to generate one or more of an audible alert, a visual alert, or a notification to a third-party.

In one or more implementations, the video feed captured by a camera is transmitted over a network.

In one or more implementations, when determining if a number of people in a monitored video frame is above a group threshold, calculating a distance between each respective person among the number of people in the monitored video frame to each of the other people in the monitored image in response to the number of people being above the group threshold, and comparing each calculated distance to a distance threshold, are performed by a processor remote from the camera.

In an aspect, a non-transitory computer readable medium is provided having stored thereon software instructions that, when executed by a processor, configure a processor to monitor video frames of a video feed captured by a camera, determine if a number of people in a monitored video frame is above a group threshold, calculate a distance between each respective person among the number of people in the monitored video frame to each of the other people in the monitored image in response to the number of people being above the group threshold, compare each calculated distance to a distance threshold, and generate an alert in response to any calculated distance not satisfying the distance threshold.

The present disclosure also provides systems, methods, and non-transitory computer readable mediums for and tracing persons of interest using video surveillance footage.

In an aspect, a video analysis system for tracing a person of interest is provided. The system includes at least one camera generating a video feed of an area, a data store containing at least one image of the person of interest, a memory, and a processor in communication with the memory to access computer-readable instructions that when executed configure the processor to: obtain an image of a person of interest from the data store, monitor the video feed, identify one or more video frames in the video feed in which the person of interest is identified using a facial recognition component configured by the processor and the obtained image of the person of interest, determine whether the person of interest is within a distance threshold of another person in each of the identified video frames, identify each person who is within the distance threshold of the person of interest using the facial recognition component, generate a list of each identified person, and transmit the list of each identified person.

In one or more implementations, the system further includes a distance determiner component configured to determine whether the person of interest is within the distance threshold of another person in each of the identified video frames. In one or more implementations, one or more of the distance determiner component and the facial recognition component are trained by a machine learning classifier trained on labeled videos or images to classify and interpret the one or more video frames. In one or more implementations, the facial recognition component is configured to compare properties of the obtained image of the person of interest to properties of the one or more video frames in the video feed in which the person of interest is identified. The compared properties can be, for example, one or more of color, object shape, or object size.

In one or more implementations, the processor is configured to access the data store to determine personal information about each identified person to add to the generated the list of identified persons. In one or more implementations, the processor is configured to transmit the list of each identified person based on the determined personal information to a desired recipient.

In one or more implementations, the system includes a display having a user interface component configured to display the generated list of each identified person.

In an aspect, a method of tracing a person of interest using video is provided. For example, the method may be carried out by a processor configured by executing software instructions accessible from a computer readable medium. The method includes obtaining an image of a person of interest. For example, the image of the person of interest can be obtained from a data store. Next, the method includes monitoring one or more video feeds and identifying one or more video frames in the one or more video feeds in which the person of interest is identified using a facial recognition component and the obtained image of the person of interest. Further, the method includes determining whether the person of interest is within a distance threshold of another person in each of the identified video frames and identifying each person who is within the distance threshold of the person of interest using the facial recognition component. Thereafter, the method generates a list of each identified person, and transmits the list of each identified person.

In one or more implementations, in the method the processor is further configured to provide the one or more video feeds to a machine learning classifier, the machine learning classifier trained to classify the one or more video feeds to recognize persons in the video feeds.

In one or more implementations, when determining whether the person of interest is within the distance threshold of another person in each of the identified video frames, in the method the processor is further configured to: identify a second person in the first set of images by the machine learning classifier, calculate a first physical distance between the first person and the second person in the identified video frames using a distance determination model that uses a first size of a first bounding box around the first person to determine a first depth component of a first set of coordinates for the first person, and that uses a second size of a second bounding box around the second person to determine a second depth component of a second set of coordinates for the second person, compare the first calculated physical distance to a distance threshold condition, and repeat these steps for each other person in the identified video frames.

In one or more implementations, in the method the processor is further configured to classify the second person as a person of interest, and repeat identification procedures for each other person in the identified video frames with respect to the second person as the person of interest.

In one or more implementations, when identifying each person who is within the distance threshold of the person of interest using the facial recognition component, in the method the processor is further configured to compare at least one image from each of the identified video frames to at least one subset of images.

In one or more implementations, in the method the processor is further configured to store images of each identified person as additional person of interests at the data store. In one or more implementations, in the method the processor is further configured to access the data store to determine personal information about each identified person to direct transmission of the list of each identified person to a desired recipient. In one or more implementations, in the method the processor is further configured to capture an image of one of the one or more video frames that include one or more unidentified persons that were within the distance threshold of another person in each of the identified video frames, generate a list of unidentified persons including the captured images of the one or more video frames, and transmit the list of unidentified persons.

In an aspect, a non-transitory computer readable medium having stored thereon software instructions that, when executed by a processor, configure a processor to obtain an image of a person of interest, monitor one or more video feeds, identify one or more video frames in the one or more video feeds in which the person of interest is identified using a facial recognition component and the obtained image of the person of interest, determine whether the person of interest is within a distance threshold of another person in each of the identified video frames, identify each person who is within the distance threshold of the person of interest using the facial recognition component, generate a list of each identified person, and transmit the list of each identified person.

The present disclosure includes methods having actions corresponding to the functions of the system, and non-transitory computer-readable mediums having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Current conventional techniques for crowd detection and people counting analytics are not well calibrated for identifying social distancing violations. For example, when two or more people fail to maintain a certain distance from one another in violation of social distancing rules enforced during a pandemic. Further, conventional techniques fail to implement suitable methods for automatically alerting persons that a social distancing violation is occurring.

Moreover, generating an accurate distance measurement between any two objects, such as people, in a video frame of a video feed to determine whether those objects are a sufficient distance apart to meet social distancing rules is difficult given the complexities and distortions that are commonly found in video streams.

To address these and other needs, aspects of the present disclosure provide systems and methods to produce accurate measurements of distance between people, and/or counting and tracking of people in a monitored area, to enable the monitoring of social distancing compliance and/or occupancy compliance using video streams from one or more video cameras. The system and method utilize a combination of features and algorithms to identify objects, such as people in this case, and calculate the distance between all people in a monitored area and/or track and count the number of people in the monitored area. In particular, the present disclosure discloses technologies in which video analytics are used to calculate the relative distance between persons in a video feed to identify when persons fail to remain a safe distance from one another, such as the "six feet" rule of social distancing for COVID-19, and if so, alerts are generated, such as notifying an appropriate authority of the violation or generating an audio alert locally where the social distancing violation occurred to obey social distancing rules. The disclosures herein are widely applicable for COVID-19 social distancing situations, but can also be used to maintain appropriate distance in other settings, such as research labs, prisons, manufacturing facilities and warehouses.

In one or more implementations, the present disclosure includes systems and methods of identifying and generating alerts for social distancing violations in which video feeds are captured by one or more cameras located in different regions of an environment and are monitored to determine if a number of people in the video feeds are above a group threshold. To facilitate such determinations, the systems and methods provided herein include a computer system comprising a memory storing computer executable instructions and a processor configured to execute the instructions. Upon monitoring the video frames or images of the video feeds, the systems and methods herein calculate a distance between each respective person of the number of people to each of the other people in the monitored video frame in response to the number of people being above the group threshold. Each of the calculated distances is then compared to a distance threshold and alerts are generated in response to any calculated distance not satisfying the distance threshold.

In an aspect, one problem solved by the present solution is one of automatically identifying a person-of-interest (POI) in the video feeds captured by cameras given that there are often many people that appear in video feeds of public or private locations.

Further aspects of the present disclosure provide methods and systems that allow for identifying one or more persons-of-interest (POIs) appearing in a video feed of a particular environment, identifying any secondary persons those POIs came into contact with in that environment, and/or generating and transmitting a list of each secondary identified persons.

In one or more implementations, the present disclosure includes systems and methods of tracing POIs using video by identifying a POI and determining who that POI came into contact with in a particular time frame. To facilitate such determinations, the systems and methods provided herein include a data store containing at least one image of the person of interest and a computing device having a memory, a processor in communication with the memory to access computer-readable instructions that when executed configure the processor to carry out the methods disclosed herein. Such systems and methods include obtaining an image of a POI, such as from the data store, monitoring one or more video feeds captured from one or more cameras, and identifying video frames in the one or more video feeds in which the person of interest is identified using facial recognition techniques and the obtained image of the person of interest. Thereafter, the systems and methods disclosed herein determine whether the POI is within a distance threshold of another person in each of the identified video frames. If so, an image of that additional person is captured. The captured image of the additional person is compared to images in a data store, which may be the same data store as holds the images of POIs or may be a separate data store, or is compared to a subset of images in the original or other data store, using facial recognition techniques to identify the additional person. For example, the captured image of the additional person is compared to images of employees working at the location being surveilled or images taken of visitors at a location to ascertain the additional person's identity. Once identified, the additional person is tracked and added to a list of identified persons, which can thereafter be transmitted remotely. In one or more implementations, if the facial recognition techniques are unable to identify a person who is within the distancing threshold, the captured images of those unidentifiable persons can be tracked and added to a separate list of unidentified people.

Figure 1:
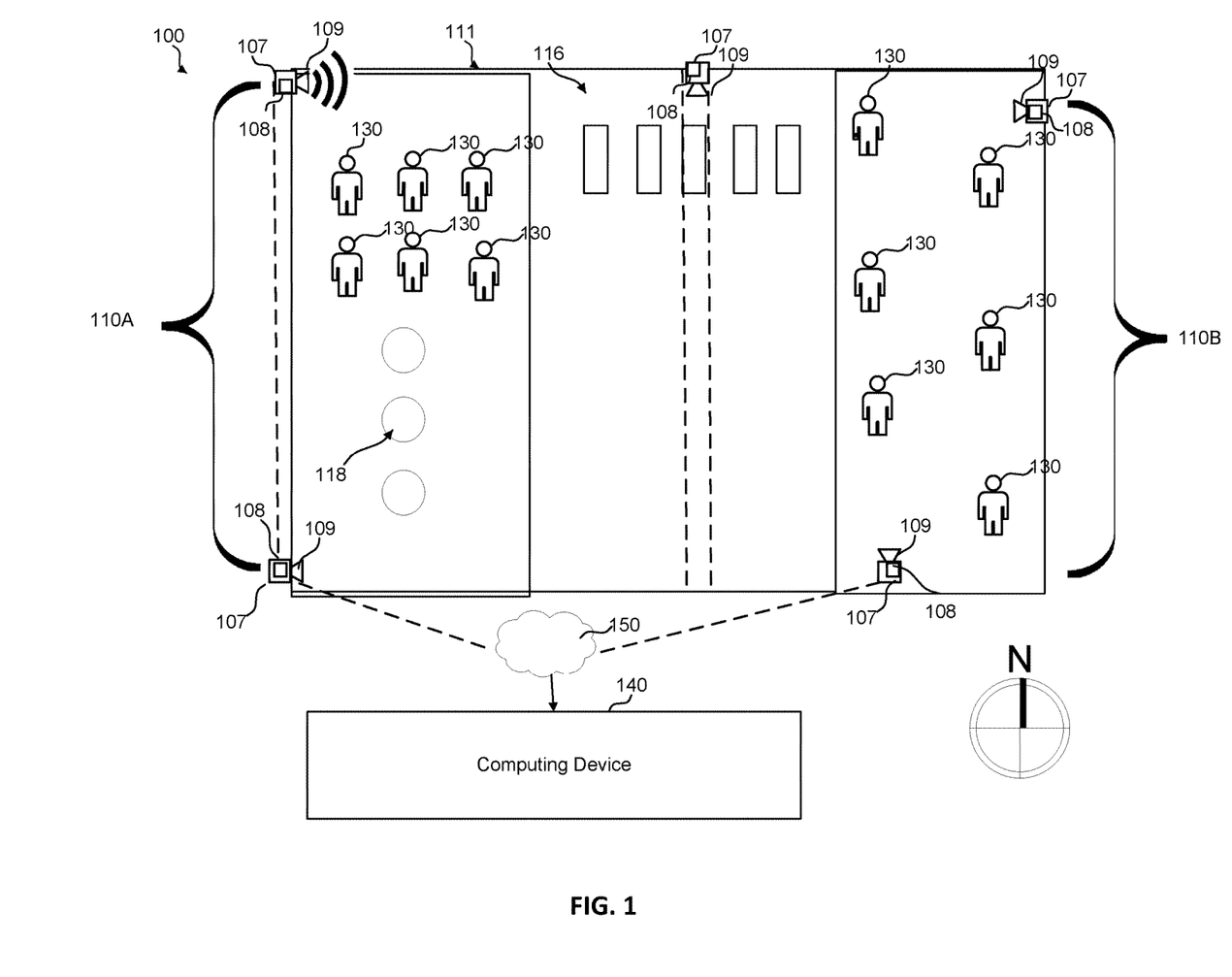
FIG. 1 is a schematic diagram of an example environment location including a system for monitoring social distancing adherence in accordance with one or more implementations of the present disclosure.
Figure 2:
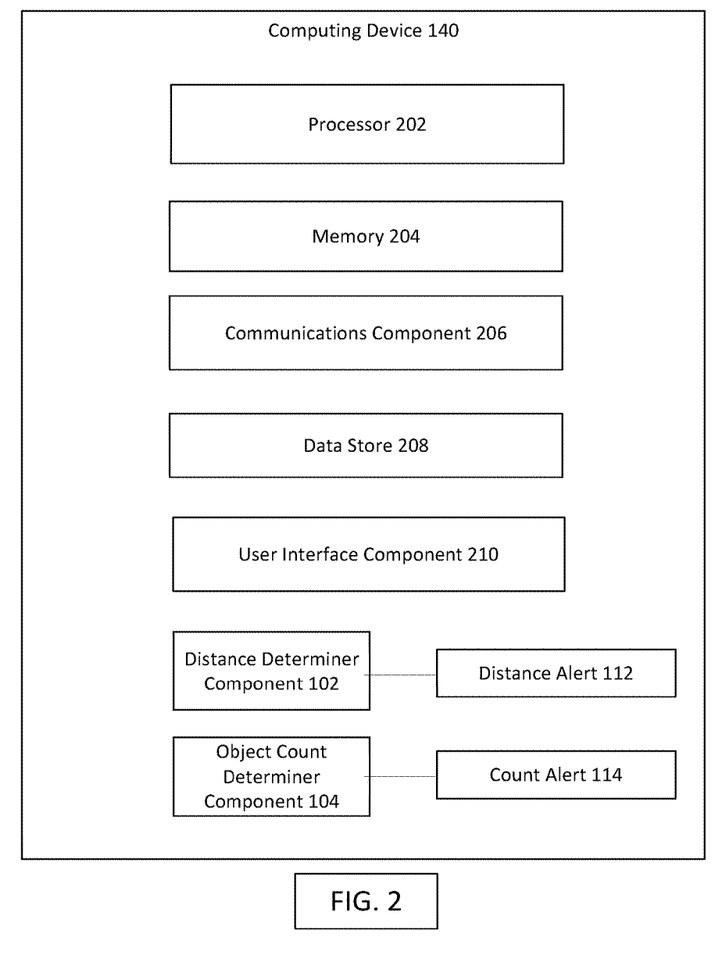
FIG. 2 is a block diagram of a computer device in accordance with one or more implementations of the present disclosure.

Referring now to FIGS. 1-2, in one non-limiting aspect, a video analysis system 100 is configured to determine physical information from a video frame, identify if people are within a particular distance threshold, and to generate alerts. For example, system 100 is configured to generate an alert based on a physical distance between identified objects (e.g., people), and/or to generate an alert based on a count of a number of the identified objects.

In one or more implementations, the system 100 includes a distance determiner component 102 and/or an object count determiner component 104 configured to receive one or more video feeds from one or more video cameras 107 monitoring one or more areas 110 of an environment 111 and respectively generate a distance alert 112 and/or an object count alert 114 based on analyzing one or more frames of the one or more video streams.

In the example implementation of FIG. 1, the system 100 is located in an outdoor environment 111 in order to monitor persons on corresponding sides of a street 116 in which one or more persons 130 are gathered. The video cameras 107 are arranged to capture video of various areas 110, such as for example, area 110A representing the west side of the street, and area 110B representing the east side of the street. A person of skill in the art would understand that the disclosed systems and methods are applicable to a variety of environments, such as a store, an office building, or a park, or a particular area within an environment such as a floor, elevator, hallways, room, parking lot, etc., and the present disclosure is not limited to the example location or areas and associated activities thereof.

Each camera 107 may be a digital video camera such as a security camera. The multiple cameras 107 may be located throughout the areas 110. Each of the cameras 107 may provide a constant video feed of one or more of the areas 110. The cameras 107 may generally be oriented in a default direction to capture a particular area 110 where activity is expected, but one or more of the cameras 107 may be mounted on a gimbal that allows rotation and/or panning of the respective camera 107. For example, the system 100 may move a camera 107 to maintain the field of view of the camera on one or more persons 130. In another aspect, the system 100 may allow manual control over one or more cameras 107. In one or more implementations, a camera 107 may further include a processor coupled with one or more of a visual display 108, a speaker 109, a wireless or wired transceiver capable of transmitting data over a network, and a memory. The visual display 108 is coupled with the camera 108 so as to be visible from the outside and is communicatively coupled with the processor so as to be configured to broadcast textual, graphical, and video messages. The speaker 109 may be housed internally within the camera or external to the camera, though the speaker remains communicatively coupled with the processor in either implementation. In this way, the processor of the camera 107 can instruct the transceiver to transmit video feeds to an external or internal computing device 140, or receive instructions to generate an alert, as disclosed elsewhere herein.

The system 100 includes software that is configured to determine what objects appearing in the video feeds generated by cameras 107 constitute a person 130. To determine a person, the system 100 can review video frames of a video feed in which persons are present and the coordinates of said persons in the video frame are known and provided to the system. For example, the system 100 can access a database or other data store of images and use image processing algorithms, facial recognition techniques, and machine learning techniques on a set of images in order to establish what objects in the video frames are likely to represent a person 130. In one or more implementations, the system 100 is provided with base images of an area the cameras 107 are surveilling in which no persons are present. In addition or alternatively to the above techniques, the software of the system 100 can also compare these base images having no people present to the video frames of the video feed to determine whether new objects in the video frames are considered to be people. In one or more implementations, bounding boxes are placed about identified new objects, and boxes whose dimensions fall below or above certain thresholds or boxes whose position in the video feed changes above a certain threshold can be used to eliminate non-human objects. For example, boxes that identify new objects having dimensions smaller or larger than conventional human size (e.g., 2 feet by 2 feet or less, or a height of over 7 feet or width of over 4 feet), or new objects whose bounding box positions change rapidly over subsequent video frames, can be discarded. In this way, non-human objects, such as birds, dogs, or cars will not be identified as people by the system 100.

In one example implementation, the system 100 may be used for monitoring social distancing limits and/or occupancy limits in the monitored areas 110. The system 100 may include a camera enrollment process that uses reference objects of known physical size in a video frame. An image processing algorithm is run against the frame with the reference objects included, and generates a data file providing ratios that can be used by a run time solution to convert pixel distance to real, physical distance. For example, the reference objects may be images of persons having known heights and having known pixel distance conversions at particular distances from the cameras 107. Additionally or alternatively, the reference objects could be markings or symbols placed at the location having known distances from one another, such as symbols 118 located on the ground of the area 110A. For example, a location may include known social distancing symbols on the ground such as circles, squares, "X" marks, or other known indicia that are assumed to be the social distancing threshold apart.

In one or more implementations, the system 100 includes a video processing pipeline that identifies the bounds of each person in a frame using for example, overlaying box bounding technology onto image frames of the video feed. Tracking algorithms are used to ensure occluded persons are considered and not lost across frames. This information is passed on to the next stage in the video processing pipeline, which is responsible for calculation of the distance between each person and its nearest neighbor. The algorithm used for distance calculation will convert the Euclidian distance between the outer bounds of the bounding boxes about each person 130 and neighboring persons into real, physical distance measurements, as discussed herein.

Notably, the algorithms disclosed herein utilize a size of a person bounding box to contribute to the distance calculation. In particular, in most cases, the camera angle of a respective video camera 107 is not exactly top down or eye level. As such, the present solution uses the size of the bounding box as an additional feature to estimate the distance of the person to the video camera 107. The algorithm that computes the pixel distance between two objects (in this case the people) and uses a 3-dimensional model and the size of the bounding box of the person in providing the Z component of the position coordinates. The X and Y components are transformed from Euclidian distance to real distance using the information stored during the enrollment process. As such, physical distance between objects is calculated, and object count (or occupancy) is calculated.

The distance determiner component 102 and/or the object count determiner component 104 may utilize this information to generate the distance alert 112 and/or the object count alert 114. For example, the distance determiner component 102 and/or the object count determiner component 104 may implement a presentation layer to convey information in the distance alert 112 such as, but not limited to, an average distance between all people in a zone, a closest distance of any person to another person, or a social distance violation alert if the physical distance between two objects violates a minimum distance threshold condition—e.g., within six feet. Similarly, for example, the object count determiner component 104 may implement a presentation layer to convey information in the distance alert 112 such as, but not limited to, the object count alert 114 that identifies a number of people in a zone, or a maximum occupancy alert if the object count meets or violates a maximum occupancy threshold. For example, the maximum occupancy threshold may be four persons.

For example, with reference to FIG. 1, the system 100 is monitoring an environment 111 having two areas of interest, the west side of the street 110A and the east side of the street 110B. As is illustrated, the system 100 would determine that the people 130 at area 110A are violating social distancing rules as the object count would identify six persons within social distancing thresholds and would correspondingly generate an alert through the visual display 108 and/or the speaker 109 that would be visible and or audible to the people 130 at area 110A. Additionally or alternatively, the system 100 may transmit a notice alert over a wireless network 150 to a third-party local to the area 110, such as a security guard patrolling the area, or to a third-party remote to the area, such as to a police officer or police station. In contrast, the system 100 would determine that the persons 130 at area 110B are obeying social distancing rules as no persons are within the minimum threshold distance conditions, despite there being six total persons identified within the area 110B.

In a further aspect of the present disclosure, in instances in which the system 100 identifies that a plurality of persons 130 are currently violating a minimum threshold condition, the system 100 is capable of distinguishing between groups of persons 130 that may be excepted from social distancing rules. For example, small parties of four or less persons that arrive at an area 110 together and remain together without contacting other persons 130 for the duration of their appearance on the video feed may be interpreted as being a family practicing group social distancing. Similarly, a party in which a small number of persons are determined to be together in which the relative sizes of the persons greatly differ, the system 100 may determine that these persons represent a parent and one or more children, which are not subject to social distancing rules. In one or more implementations, the system 100 may determine if a group of persons 130 is subject to a family social distancing exclusion by comparing video frames in the video feed received by the one or more cameras 107 when the group of persons 130 entered the area 110 and subsequent video frames.

As noted above, the approach described herein can be applied to video streams of varying resolution, focal length, angle and lighting conditions.

For example, for handling distortions/warping in video frames, the system 100 utilizes a perspective transformation algorithm on the frame at strategic points gathered during the enrollment process to deal with image warping and distortions.

For example, for dealing with varying lighting conditions, the system 100 may utilize one or more solutions such as, but not limited to: model selection based on frame timestamp, or image processing to enhance the lighting based on pixel intensity at strategic locations. For instance, for model selection based on time of day, the system 100 may switch between separate models that are separately trained with data collected during daytime and nighttime hours, which would yield better results than a combined model. Further, for dynamic frame light intensity adjustment, a number of regions may be identified during the enrollment process, wherein the identified regions are believed to be subject to a greatest degree of light intensity changes. For example, such an identified region may include, but is not limited to, areas by windows or lights. The system 100 may then adjust the frame lighting using image processing techniques to compensate for low light conditions. Also, the system 100 may generate image masks for varying light conditions and super-impose them on the images.

In one or more implementations, the video feeds captured by cameras 107 are passed to a computing device 140, which may implement all or a portion of the functionality described herein. With reference also to FIG. 2, the computing device 140 can be any computer device programmed to evaluate at least a video feed from one or more cameras 107 to monitor video frames of the video feed to detect persons, determine if persons are located in the areas 110 are obeying social distancing protocols, and if not, to generate alerts. In one or more implementations, the computing device 140 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing video data captured by the cameras 107. In one or more other implementations, the computing device 140 is a cloud-based or shared computing structure accessible through a wireless network 150. The computing device 140 may be located remote from the environment 111, or may be integrated as hardware at the cameras 107.

The computing device 140 includes a processor 202 which may be configured to execute or implement software, hardware, and/or firmware modules that perform any functionality described herein. For example, the processor 202 may be configured to execute or implement software, hardware, and/or firmware modules that perform any functionality described herein with reference to the distance determiner component 102 generating the distance alert 112 and/or the object count determiner component 104 generating the object count alert 114, or any other component/system/device described herein.

The processor 202 may be a micro-controller, an application-specific integrated circuit (ASIC), a digital signal processor (DSP), or a field-programmable gate array (FPGA), and/or may include a single or multiple set of processors or multi-core processors. Moreover, the processor 202 may be implemented as an integrated processing system and/or a distributed processing system. The computing device 140 may further include a memory 204, such as for storing local versions of applications being executed by the processor 202, or related instructions, parameters, etc. The memory 204 may include a type of memory usable by a computer, such as random access memory (RAM), read only memory (ROM), tapes, magnetic discs, optical discs, volatile memory, non-volatile memory, and any combination thereof. Additionally, the processor 202 and the memory 204 may include and execute an operating system executing on the processor 202, one or more applications, display drivers, etc., and/or other components of the computing device 140.

Further, the computing device 140 may include a communications component 206 that provides for establishing and maintaining communications with one or more other devices, parties, entities, etc. utilizing hardware, software, and services. The communications component 206 may carry communications between components on the computing device 140, as well as between the computing device 140 and external devices, such as devices located across a communications network 150 and/or devices serially or locally connected to the computing device 140. In an aspect, for example, the communications component 206 may include one or more buses, and may further include transmitting chain components and receiving chain components associated with a wireless or wired transmitter and receiver, respectively, operable for interfacing with external devices. In another aspect, for example, the communications component 206 is capable of communicating over a network 150 with the components of system 100 in a cloud-based implementation of computing device 140.

Additionally, the computing device 140 may include a data store 208, which can be any suitable combination of hardware and/or software, that provides for mass storage of information, databases, and programs. For example, the data store 208 may be or may include a data repository for applications and/or related parameters not currently being executed by processor 202. In addition, the data store 208 may be a data repository for an operating system, application, display driver, etc., executing on the processor 202, and/or one or more other components of the computing device 140.

The computing device 140 may also include a user interface component 210 operable to receive inputs from a user of the computing device 140 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Moreover, the system 100 may be implemented as an occupancy and social distancing solution that integrates Artificial Intelligence (AI) or machine learning based social distance measurements by the computing device 140. For example, the distance determiner component 102 and/or the object count determiner component 104 may be trained by a machine learning classifier trained on labeled videos or images to classify and interpret video frames from a video feed in order to determine whether there are persons present in an area 110, identify how many persons are in the area, and to calculate the distances between respective identified persons. That is, the distance determiner component 102 and/or the object count determiner component 104 may utilize supervised learning to classify input video and determine whether persons in a particular area 110 are obeying social distancing rules. In an aspect, the distance determiner component 102 and/or the object count determiner component 104 may be trained using reinforcement learning with a goal to correctly identify persons and their relative positions to one another in a video segment. For example, when the input video stream closely matches the training videos for persons not obeying social distancing rules, the distance determiner component 102 and/or the object count determiner component 104 may determine that social distancing rules have been violated.

Figure 3:
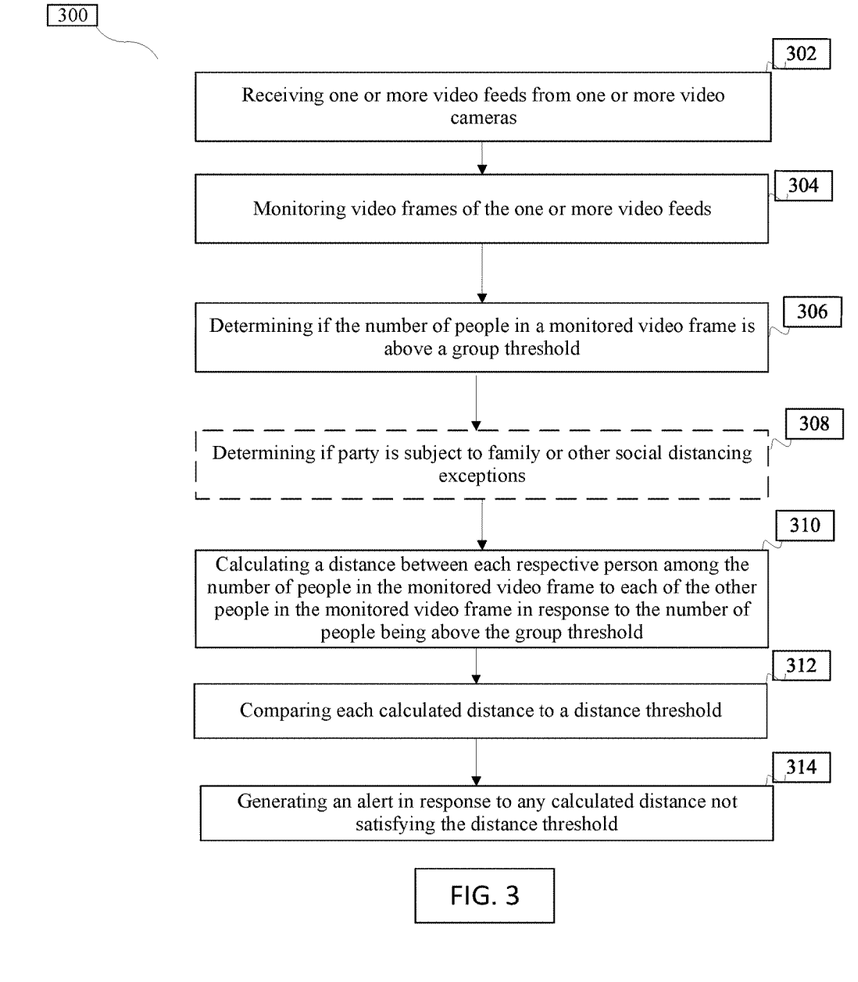
FIG. 3 is a method flow of an example method for monitoring social distancing adherence in accordance with one or more implementations of the present disclosure.

Referring to FIG. 3, in operation, the computer device 140 may perform an example method 300 of whether persons are obeying social distancing rules using video frames captured from one or more video feeds in a particular area. The method 300 may be performed by one or more components of the computing device 140 and/or any device/component described herein.

At block 302, the method 300 includes receiving one or more video feeds from one or more video cameras monitoring an area. For example, video feeds from cameras 107 may be passed to a computing device 140 through a wireless network 150 for processing. In one or more implementations, the video feeds include video frame information that permits time-stamp identification of the status of an area at a particular time.

At block 304, the method 300 continues in which video frames of a video feed are monitored. For example, advantageously, the most recent video frames provided by the feed can be identified by the computing device 140 and/or a processor at the computing device or elsewhere (such as in a cloud-based solution) and analyzed.

At block 306, the method 300 determines if the number of people in a monitored video frame is above a group threshold. For example, a group threshold may be set by a processor executing instructions to permit a maximum of five persons within proximity to one another in a given area according to social distancing rules.

At block 308, in one or more implementations, the method 300 determines if the party is subject to any family or other social distancing exceptions. For instance, the distance determiner component 102 and/or the object count determiner component 104 may determine whether the people detected in the video frames as exceeding the group threshold are a family or other social group permitted to be in proximity to one another. This can be done by comparing the relative heights of detected persons and detecting the arrangement of the persons in the first frame that they appear in the surveilled area and in one or more subsequent frames. If the method 300 determines that the detected persons are subject to an exception, the system will not generate a social distancing alert due to this violation, though it may still generate an alert if additional people are detected that are violating the social distancing rules.

At block 310, the method 300 calculates a distance between each respective person among the number of people in the monitored video frame to each of the other people in the monitored video frame in response to the number of people being above the group threshold. For example, the distance determiner component 102 may calculate such distances.

At block 312, the method 300 compares each calculated distance to a distance threshold. For example, the processor may execute instructions to configure the distance threshold to be a pre-determined distance, such as one, two, three, four, five, six feet, or any other desired distance threshold.

At block 314, the method 300 generates an alert in response to any calculated distance not satisfying the distance threshold upon comparing each calculated distance to the distance threshold. For example, the processor may be configured to generate an alert that is a notification transmitted to appropriate authorities over a wireless network (e.g., a security guard, the police), it can be an audio or visual alert generated and broadcast locally by a visual display and/or speaker, or a combination of any of these alerts. In one or more implementations, the generated alert is transmitted to a camera 107 and broadcast by visual display 108 and/or amplified through the on-board speaker 109.

Figure 4:
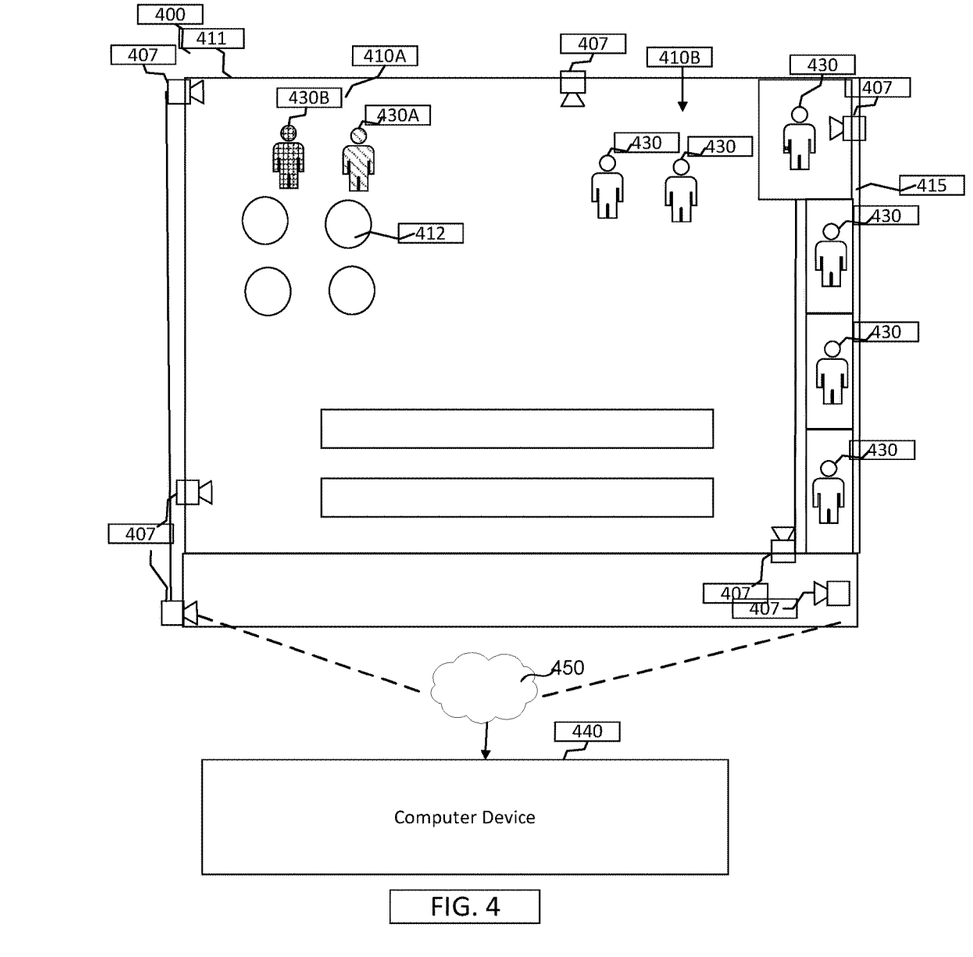
FIG. 4 is a schematic diagram of an example environment for identifying persons-of-interest in a video stream in accordance with one or more implementations of the present disclosure.
Figure 5:
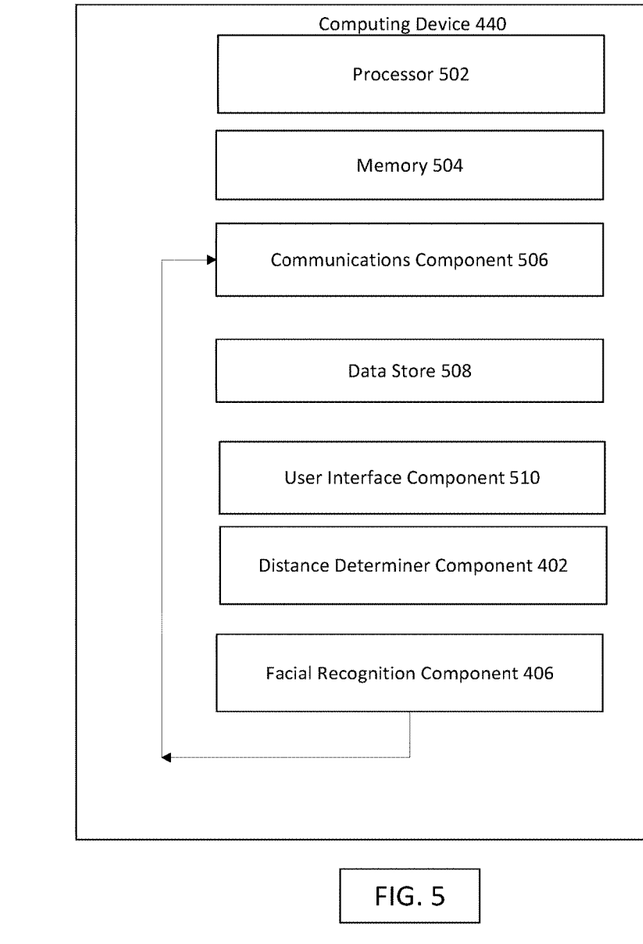
FIG. 5 is a block diagram of a computer device in accordance with one or more implementations of the present disclosure.

Referring now to FIGS. 4-5, in one non-limiting aspect, a video analysis system 400 is configured to identify one or more persons-of-interest (POIs) in a video stream of a particular environment, identify any secondary persons those POIs came into contact with in that environment, and/or generating and transmitting a list of each secondary identified persons for review. For example, system 400 is configured to identify particular video frames in a video feed having a POI using facial recognition technologies, and configured to identify each person who came within a prescribed distance threshold of that person. The distance threshold for identifying a POI may be, but is not required to be, a prescribed social distance. For example, the distance threshold can be any set desired distance that the system 400 is capable of measuring between persons.

In one or more implementations, the system 400 includes a distance determiner component 402, and/or a facial recognition component 406 configured to receive one or more video feeds from one or more video cameras 407 monitoring one or more areas 410 of an environment 411 and respectively identify a POI appearing in one or more video frames of the video feeds by comparing, using facial recognition techniques, the video frames to images of the POI accessible in a data store 508 or other database, generate a tracing count alert to generate a list of identified persons who came in contact with the POI based on analyzing one or more frames of the one or more video feeds 406. The one or more cameras 407 may further include a processor coupled with one or more of a visual display, a speaker, a wireless or wired transceiver capable of transmitting data over a network, and a memory. The components of system 400 may further include the functionality of analogous components as disclosed elsewhere herein—e.g., distance determiner 102, object count determiner component 104, cameras 107, distance alert 112, object count alert 114—and further functionality as disclosed below.

In the example implementation of FIG. 4, the system 400 is located in an indoor environment 411 in order to monitor one or more persons 430 gathered therein. The video cameras 407 are arranged to video of various areas 410, such as for example, an area 410A representing an area covering a grouping of tables 412, and an area 410B representing the area outside of a concierge or security desk 415. A person of skill in the art would understand that the disclosed systems and methods are applicable to a variety of environments, such as a store, an office building, or a park, or a particular area within an environment such as a floor, elevator, hallways, room, parking lot, etc., and the present disclosure is not limited to the example location or areas and associated activities thereof.

The system 400 includes software that is configured to determine what objects appearing in the video feeds generated by cameras 407 constitute a person 430. Such software may be, for example, the software associated with system 100 for detecting persons in a video frame from a video feed. To determine a person, the system 400 can review video frames of a video feed in which persons are present and the coordinates of said persons in the video frame are known and provided to the system. For example, the system 400 can access a database or other data store of images and use image processing algorithms, facial recognition techniques, and machine learning techniques on a set of images in order to establish what objects in the video frames are likely to represent a person 430. In one or more implementations, the system 400 is provided with base images of an area the cameras 407 are surveilling in which no persons are present. In addition or alternatively to the above techniques, the software of the system 400 can also compare these base images having no people present to the video frames of the video feed to determine whether new objects in the video frames are considered to be people. In one or more implementations, bounding boxes are placed about identified new objects, and boxes whose dimensions fall below or above certain thresholds or boxes whose position in the video feed changes above a certain threshold can be used to eliminate non-human objects. For example, boxes that identify new objects having dimensions smaller or larger than conventional human size (e.g., 2 feet by 2 feet or less, or a height of over 7 feet or width of over 4 feet), or new objects whose bounding box positions change rapidly over subsequent video frames, can be discarded. In this way, non-human objects, such as birds, dogs, or cars will not be identified as people by the system 400.

Further, in an aspect, the system 400 includes a facial recognition component 406 that identifies particular individuals as known POIs. In one or more implementations, a POI may be identified by a name, an image of the POI, and/or related identifying information (e.g., the POI's relation to the environment such as occupation or identification as a known visitor). For example, the system 400 can receive a name as input (through e.g., user interface component 510) and can then access a data store having images of POIs to locate a base image of the requested POI. Thereafter, the facial recognition component 406 may compare detected persons in one or more video feeds with the base images of the POI from the data store 508 to determine whether a detected person is a POI. If the detected person is identified as a POI, the system 400 can then identify persons who have come into proximity with the detected POI, such as by using the social distancing technology systems and methods disclosed elsewhere herein. Information relating to each person that is identified as having come into contact with a POI is recorded and used to generate a list of identified persons who came into contact with the POI. For example, the system 400 may capture an image of each of the identified POI-contacted persons to create a list of images for distribution, or further, the system 400 may compare the images of each identified POI-contacted person to images in a data store to determine further personal information about these additional persons, such as name, occupation, contact information, etc. Depending on the type of POI or POI-contacted person sought, the system 400 can access different sets or subsets of data stores to gather such further personal information. The personal information may be used to tailor and transmit the generate alerts having the personal information included to particular persons or entities who are suited to make use of the information regarding the POI. For example, if the environment is an office building, the data store could include information about all companies that reside in the building, the employees who work for each company would correspond to a subset of data, and which employees who work on a particular floor could be a further subset, etc. If a POI is identified as being an employee that works for a company in the building's data store, the alert that a POI has been identified can be generated and sent directly to the building or company for review and the personal information can be included on the generated list. Additionally, in another example, there may be computerized login systems associated with entry to the environment 411 or particular areas 410 thereof that capture information related to persons in the environment that system 400 could access to gather information about identified persons. Thereafter, the system 400 is capable of transmitting these generated lists of identified persons to an appropriate destination or desired recipient—e.g., the owner, manager, or personnel contact of the environment 411, law enforcement or health authorities, to the identified persons themselves, etc. In this way, the system could reasonably identify who might reasonably be added to a list for distribution or who should be notified as to a POI's contacts.

For example, as is illustrated in FIG. 4, the system 400 is monitoring an environment 411 for POIs which has two areas of interest, areas 410A and 410B. As described herein, the system 400 is continuously receiving video feeds of these areas, capturing video frames of the respective feeds, determining whether persons 430 are located in the areas, and whether such detected persons are a POI. Here, the system 400 has identified a POI 430A and has identified that this POI came within the distance threshold to constitute a contact with a secondary person 430B. In this example, the system 400 captures an image of secondary person 430B and then accesses one or more data stores, e.g., a building information database, a company employee database, to gather information about the secondary person to compile into the generated list. The system 400 then repeats this process while continuing to search for other persons who came into proximity with POI 430A, adding any persons who were in close contact with the POI to the generated list. In one or more implementations, the system 400 may perform further iterative identification functionality to determine all persons that came into contact with secondary person 430B, and so on.

In one or more implementations, the system 400 searches for additional persons that contacted a POI 430A for a set time period. For example, the system 400 may search the video feeds gathered by cameras 407 for the previous 24 hours.

In one or more implementations, the video feeds captured by cameras 407 are passed to a computing device 440, which may implement all or a portion of the functionality described herein. With reference to FIG. 5, the computing device 440 includes a processor 502, a memory 504, a communications component 506, a data store 508, and a user interface component 510. The components of computing device 440 include the functionality of analogous components as disclosed elsewhere herein with respect to computing device 140—e.g., processor 202, memory 204, communications component 206, data store 208, and user interface component 210—and further functionality as provided below. The computing device 440 may be integrated with the cameras 407, may be a local or remote mobile or fixed computer device (e.g., a server, desktop, laptop, etc.), or may be a cloud-based or shared computing structure accessible through a wireless network 450.

In one or more implementations, the computing device 440 is configured by the processor 502 to execute software hardware, and/or firmware modules to perform any functionality described herein. For example, the processor 502 may be configured to execute or implement software, hardware, and/or firmware modules that perform functionality described herein with reference to the distance determiner component 402, the facial recognition component 406, or any other component/system/device described herein.

In an aspect, the processor 502 can configure the facial recognition module 406 to use images captured from a video feed of cameras 407 to identify video frames that a POI appears in by comparing captured images to base images of the POI stored in the data store 508. For example, the facial recognition component 406 can compare the face of an identified person to the base images of the POI. In one or more implementations, the facial recognition module 406 operates by comparing properties of the captured image and the base image such as color (e.g., hue, lightness, or saturation), object shape (e.g., shape of face), object size (e.g., of person) or other conventional image comparison attributes.

Moreover, the system 100 may be implemented as a person-identification and tracking solution that integrates Artificial Intelligence (AI) or machine learning based identification and tracking functionality by the computing device 440. For example, the distance determiner component 402, and/or the facial recognition component 406 may be trained by a machine learning classifier trained on labeled videos or images to classify and interpret video frames from a video feed in order to determine what persons are present in an area 410, whether those persons are the same as those in images stored in a data store, to identify what other persons are in the area, and to calculate the distances between respective identified persons. That is, the distance determiner component 402, and/or the facial recognition component 406 may utilize supervised learning to classify input video and determine whether persons in a particular area 410 are POIs and if so, whether any POIs came into contact with other persons 430. In an aspect, the distance determiner component 402, and/or the facial recognition component 406 can be trained by the machine learning classifier to identify each appearance on the video feed by a POI within a range of time from the first identification of said POI.

Figure 6:
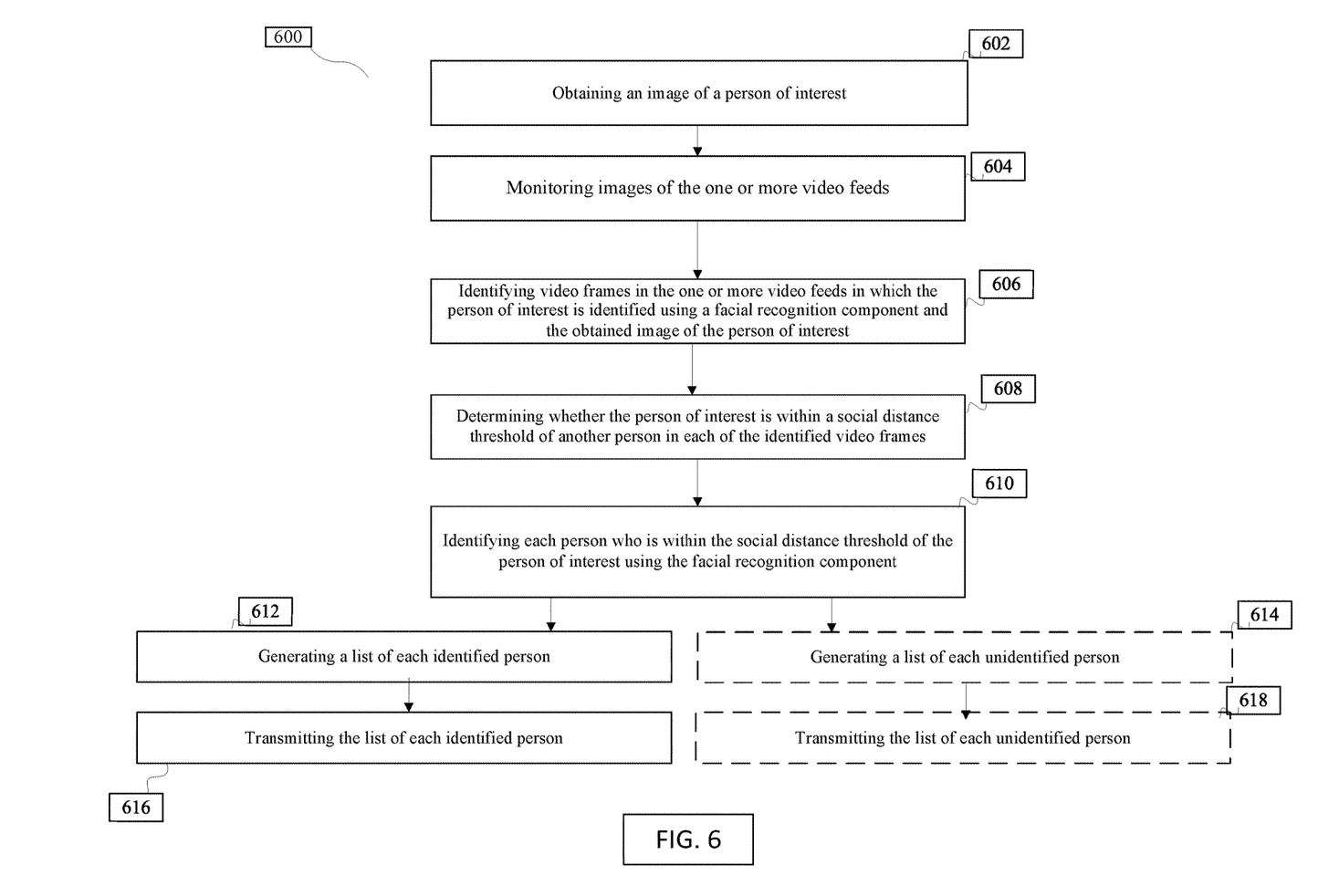
FIG. 6 is a flow diagram of an example method for determining persons-of-interest identified in a video stream in accordance with one or more implementations of the present disclosure.

Referring to FIG. 6, in operation, the computer device 440 may perform an example method 600 of identifying POIs using video frames captured from one or more video feeds in a particular area. The method 600 may be performed by one or more components of the computing device 440 or any device/component described herein.

At block 602, the method 600 obtains an image of a desired POI. In one or more implementations, an image is obtained from a data store, e.g., data store 508. For example, a name of a POI or an image of a person can be provided as input to the system (e.g., system 400) via a user interface, and a processor in the system may be configured to access a corresponding image of the POI from a data store of images of POIs. Such data stores can be defined to include images of persons have a certain characteristic, such as being employees at a particular company. In one or more implementations, a plurality of images associated with a plurality of POIs are obtained.

At block 604, the method 600 monitors images of the one or more video feeds captured by one or more cameras for the POI. For example, the one or more video feeds may be received by the computing device 440 via a communications component. In one or more implementations, the video feeds are formatted such that video frames of the feed are individually capturable by a configured processor. For example, the video feed may be segmented by particular time units or otherwise timestamped—e.g., each frame corresponding to a second of the video feed.

At block 606, the method 600 identifies one or more video frames in the one or more video feeds in which the person of interest is identified using a facial recognition component and the obtained image of the person of interest, step 606. For example, a processor is configured to identify a video frame which has detected a person using bounding box techniques disclosed herein and to capture the identified video frame as an image. This image is compared by the processor to a base image of a POI stored in an accessible data store using facial recognition techniques (e.g., facial recognition component 406). If the compared images demonstrate a high likelihood of having matched the detected person to the POI, the video frame is identified as having a POI. In one or more implementations, the video feed may be reviewed by a configured processor across a specified range of time to identify additional appearances of the detected person/POI on other video frames.

At block 608, the method 600 determines whether the person of interest is within a distance threshold of another person in each of the identified video frames. For example, the processor and/or distance determiner component can be configured to determine whether a POI is within a distance threshold of another person. In this way, the method 600 can identify what persons came into contact with a POI. For example, using bounding boxes that are the size of a person around the POI and around other detected persons in the identified video frames a pixel distance can be calculated between the POI and the additional persons, as disclosed elsewhere herein. These pixel distances can be converted to real distances and compared to a distance threshold to identify whether additional people came into close contact with the POI. In one or more implementations, the distance determiner component may implement a presentation layer to convey information such as, but not limited to, a distance violation alert if the physical distance between two objects violates a minimum distance threshold condition. The distance threshold may be any suitable distance measurable by the system, for example, within one, two, three, four, five, or six feet.

At block 610, the method 600 continues by identifying each person who is within the distance threshold of the person of interest using a facial recognition component. For example, the processor can be configured to identify each person who came within the distance threshold of the POI. In one or more implementations, identification of persons who are within a distance threshold is performed by comparing at least one image from each of the identified video segments to at least one subset of images. For example, all persons that came within six feet of the POI could be identified by accessing subsets of images in one or more data stores pertaining to different categories, such as company employee lists, using the techniques described herein. In one or more implementations, the method 600 may not be able to identify each person that violates the distance threshold relative to the POI, but may still capture images of such unidentified people.

At block 612, the method 600 generates a list of each identified person. For example, the processor can be configured to generate a list of each identified person including their name and a captured image of each identified person. In one or more implementations, the list of each identified person includes each person who had come within the distance threshold of the POI that had been identified. In one or more implementations, the list may be generated by comparing the image of each identified person to images in a data store to gather additional identifying information about the identified person such as name, place of employment, contact address, etc.

At block 614, the method 600 optionally generates a list of each unidentified person. For example, the processor can be configured to generate a list of unidentified persons including captured images of persons who violated distance thresholds of the POI but whose captured images did not match any base images in relevant data stores of known people accessing an environment.

At block 616, the method 600 then transmits the list of each identified person. For example, the list may be transmitted by a wired or wireless transceiver over a network to persons who may like knowledge of who the POI contacted, such as a building owner, manager, or personnel contact in charge of the surveilled area, an appropriate authority such as law enforcement, a security team, or health authorities, to each identified person, or remotely elsewhere as appropriate.

At block 618, the method 600 optionally transmits the list of each unidentified person. For example, the list may be transmitted by a wired or wireless transceiver over a network to persons who may like knowledge of who the POI contacted and who may know who the unidentified persons are, such as a building owner, manager, or personnel contact in charge of the surveilled area, an appropriate authority such as law enforcement, a security team, or health authorities, or remotely elsewhere as appropriate.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

What is claimed is:

1. A method of providing an alert for a distance violation, comprising:
    monitoring video frames of a video feed captured by a camera;
    determining if a number of people in a monitored video frame is above a group threshold;
    calculating a distance between each respective person among the number of people in the monitored video frame to each of the other people in the monitored video frame in response to the number of people being above the group threshold;
    comparing each calculated distance to a distance threshold;
    comparing ones of the video frames having the number of people at a first time and at a second time to determine if the number of people in the monitored video frame are subject to a social distancing exclusion; and
    generating the alert in response to any calculated distance not satisfying the distance threshold and based on the number of people not being subject to the social distancing exclusion.

2. The method of claim 1, further comprising:
    identifying the number of people by using facial recognition software.

3. The method of claim 1, wherein to determine if the number of people in the monitored video frame are subject to the social distancing exclusion comprises:
    comparing a first arrangement of the number of people at the first time and a second arrangement of the number of people at the second time, or comparing a relative height of each of the number of people; and
    determining that the social distancing exclusion applies based on the first arrangement and the second arrangement indicating a group that remains together, and/or based on the relative height of each of the number of people indicating a parent-child relationship.

4. The method of claim 3, wherein the number of people excluded from satisfying the distance threshold are classified as family members.

5. The method of claim 1, wherein calculating the distance between each respective person among the number of people in the monitored video frame to each of the other people in the monitored video frame in response to the number of people being above the group threshold comprises:
    calculating a first physical distance between a first person of the number of people and a second person of the number of people identified the monitored video frame using a distance determination model that uses a first size of a first bounding box around the first person to determine a first depth component of a first set of coordinates for the first person, and that uses a second size of a second bounding box around the second person to determine a second depth component of a second set of coordinates for the second person.

6. The method of claim 1, wherein generating the alert in response to any calculated distance not satisfying the distance threshold comprises generating one or more of an audible alert, a visual alert, or a notification to a third-party.

7. The method of claim 1, wherein the video feed captured by the camera is transmitted over a network.

8. The method of claim 1, where determining if the number of people in the monitored video frame is above the group threshold, calculating the distance between each respective person among the number of people in the monitored video frame to each of the other people in the monitored video frame in response to the number of people being above the group threshold, and comparing each calculated distance to the distance threshold, are performed by a processor remote from the camera.

9. A video analysis system for providing an alert for a distance violation, comprising:
   at least one camera generating a video feed of an area;
   a memory; and
   a processor in communication with the memory to access computer-readable instructions that when executed configure the processor to:
      monitor video frames of the video feed;
      determine if a number of people in a monitored video frame is above a group threshold;
      calculate a distance between each respective person among the number of people in the monitored video frame to each of other people in the monitored video frame in response to the number of people being above the group threshold;
      compare each calculated distance to a distance threshold;
      compare ones of the video frames having the number of people at a first time and at a second time to determine if the number of people in the monitored video frame are subject to a social distancing exclusion; and
      generate the alert in response to any calculated distance not satisfying the distance threshold and based on the number of people not being subject to the social distancing exclusion.

10. The system of claim 9, wherein the memory and the processor are coupled to a computing device.

11. The system of claim 10, wherein the computing device is a cloud-based structure.

12. The system of claim 10, where the computing device is integrated with the at least one camera.

13. The system of claim 10, further comprising a communications component for facilitating communications between the computing device and external devices.

14. The system of claim 9, further comprising a display having a user interface component.

15. The system of claim 14, wherein the display is configured to display the alert.

16. The system of claim 9, further comprising a speaker configured to output the generated alert.

17. The system of claim 9, wherein each monitored video frame includes a timestamp for identifying a respective monitored video frame.

18. The system of claim 9, further comprising a distance determiner component for implementing a presentation layer to convey information regarding the calculated distances between each respective person among the number of people in the monitored video frame to each of the other people in the monitored video frame in response to the number of people being above the group threshold.

19. The system of claim 9, further comprising an object determiner component for implementing a presentation layer to convey information regarding the number of people determined to be in the monitored video frame.

20. A non-transitory computer readable medium having stored thereon software instructions that, when executed by a processor, configure the processor to:
   monitor video frames of a video feed captured by a camera;
   determine if a number of people in a monitored video frame is above a group threshold;
   calculate a distance between each respective person among the number of people in the monitored video frame to each of the other people in the monitored video frame in response to the number of people being above the group threshold;
   compare each calculated distance to a distance threshold;
   compare ones of the video frames having the number of people at a first time and at a second time to determine if the number of people in the monitored video frame are subject to a social distancing exclusion; and
   generate an alert in response to any calculated distance not satisfying the distance threshold and based on the number of people not being subject to the social distancing exclusion.

* * * * *